(12) United States Patent
Saito et al.

(10) Patent No.: US 10,189,093 B2
(45) Date of Patent: Jan. 29, 2019

(54) OPENING AND CLOSING CHUCK

(71) Applicant: SMC CORPORATION, Chiyoda-ku (JP)

(72) Inventors: Tadashi Saito, Kashiwa (JP); Koji Hara, Tsukubamirai (JP); Kouichirou Ishibashi, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 832 days.

(21) Appl. No.: 14/600,596

(22) Filed: Jan. 20, 2015

(65) Prior Publication Data

US 2015/0217382 A1    Aug. 6, 2015

(30) Foreign Application Priority Data

Feb. 5, 2014    (JP) .................................. 2014-020131

(51) Int. Cl.
   *B25B 1/00*     (2006.01)
   *B23B 31/30*    (2006.01)
   (Continued)

(52) U.S. Cl.
   CPC ........ *B23B 31/30* (2013.01); *B23B 31/16287* (2013.01); *B23Q 7/043* (2013.01); *B25B 1/18* (2013.01); *B25B 5/061* (2013.01); *B25J 15/0293* (2013.01); *B23B 2231/22* (2013.01); *B23B 2231/32* (2013.01);
   (Continued)

(58) Field of Classification Search
   CPC .. B25B 5/061; B25J 15/00; B25J 15/02; B25J 15/08; B25J 15/083; B25J 15/086; F15B 15/1409
   See application file for complete search history.

(56) References Cited

U.S. PATENT DOCUMENTS 4,591,199 A * 5/1986 Zajac ................... B25J 15/0253
                                                            269/32
4,808,898 A    2/1989 Pearson
(Continued)

FOREIGN PATENT DOCUMENTS

CN    1357437 A    7/2002
CN    1817531 A    8/2006
(Continued)

OTHER PUBLICATIONS

Combined Office Action and Search Report dated Jul. 8, 2016 in Chinese Patent Application No. 201510082741.3 (with English translation).
(Continued)

*Primary Examiner* — Tyrone V Hall, Jr.
(74) *Attorney, Agent, or Firm* — Oblon, McClelland, Maier & Neustadt, L.L.P.

(57) ABSTRACT

A guide rail is provided on an outer surface of a chuck body. A pair of fingers is disposed on the guide rail. At least one of the pair of fingers is a movable finger that is movable along the guide rail. One or two cylinder apparatuses, each of which has a rod that advances and retracts in the direction of its axial line by the action of air pressure, are provided in the chuck body. The top end of the rod extends from an end of the chuck body to the outside. An end block is attached to the top end of the rod. The end block is linked to the movable finger.

14 Claims, 9 Drawing Sheets

(51) Int. Cl.
  *B23B 31/16* (2006.01)
  *B23Q 7/04* (2006.01)
  *B25B 1/18* (2006.01)
  *B25B 5/06* (2006.01)
  *B25J 15/02* (2006.01)
  *B23Q 3/08* (2006.01)
(52) U.S. Cl.
  CPC .......... *B23B 2270/027* (2013.01); *B23Q 3/08* (2013.01); *Y10T 279/1224* (2015.01)

(56) References Cited

U.S. PATENT DOCUMENTS

| | | | | |
|---|---|---|---|---|
| 5,163,729 | A * | 11/1992 | Borcea | B25J 15/026 294/119.1 |
| 5,529,359 | A * | 6/1996 | Borcea | B25J 15/0253 294/119.1 |
| 5,839,770 | A * | 11/1998 | Zajac, Jr. | B25J 15/0253 294/119.1 |
| 5,884,549 | A * | 3/1999 | Hosono | B23Q 1/58 92/13.7 |
| 6,309,003 | B1 * | 10/2001 | Bertini | B25J 15/0253 294/119.1 |
| 6,547,258 | B2 * | 4/2003 | Mandokoro | B25B 1/18 269/101 |
| 7,258,378 | B2 * | 8/2007 | Bellandi | B25B 5/061 294/119.1 |
| 7,488,020 | B2 * | 2/2009 | Sotome | B25J 15/026 294/119.1 |
| 7,490,881 | B2 * | 2/2009 | Null | B25B 1/18 294/119.1 |
| 7,918,149 | B1 * | 4/2011 | Bertini | B23Q 1/25 82/132 |
| 8,347,779 | B2 * | 1/2013 | Miyazawa | F15B 15/065 92/136 |
| 8,894,118 | B2 * | 11/2014 | Null | B25J 15/0293 294/119.1 |
| 8,960,074 | B2 * | 2/2015 | Hara | F15B 15/1438 29/522.1 |
| 2012/0205930 | A1 * | 8/2012 | Wilcox | B25J 15/0253 294/207 |

FOREIGN PATENT DOCUMENTS

| | | |
|---|---|---|
| CN | 102213247 A | 10/2011 |
| CN | 102554931 A | 7/2012 |
| CN | 102554931 B | 6/2015 |
| CN | 102574283 B | 1/2016 |
| JP | H05-24290 U | 3/1993 |
| JP | H05-25003 U | 4/1993 |
| JP | H05-92505 U | 12/1993 |
| JP | 9 295293 | 11/1997 |
| JP | 2001-001287 A | 1/2001 |
| JP | 2002-172579 A | 6/2002 |
| JP | 2004-050302 A | 2/2004 |
| JP | 2007-118115 A | 5/2007 |

OTHER PUBLICATIONS

Combined Office Action and Search Report dated Dec. 23, 2015 in Chinese Patent Application No. 201510082741.3 (with English translation).

* cited by examiner

OPENING AND CLOSING CHUCK

TECHNICAL FIELD

The present invention relates to an opening and closing chuck that has a pair of fingers opened and closed by the action of air pressure to grasp a workpiece, and more particularly to an opening and closing chuck that has a pair of fingers opened and closed by being moved along a guide rail.

BACKGROUND ART

An opening and closing chuck that has a pair of fingers opened and closed by being moved along a guide rail is conventionally known as disclosed in, for example, PTL 1. In this opening and closing chuck, a pair of fingers is disposed on the front surface of a casing so as to be openable and closable along a guide rail, two cylinder holes are formed in the interior of the casing so as to be parallel in the right and left direction, and pistons accommodated in the cylinder holes are individually linked to the pair of fingers with axes. The two pistons are operated by the action of air pressure to open and close the pair of fingers. Thus, an article is grasped between the pair of fingers.

In the conventional opening and closing chuck, to mutually link the pistons and fingers, cutouts like slotted holes, which communicate with the cylinder holes, are formed at positions, on the front surface of the casing, opposite to the two cylinder holes so as to be along the cylinder holes, the axes are fixed to linking pieces fixed to the fingers, a slotted hole is formed in each piston, the slotted hole being orthogonal to the axial line of the piston, and the axis is inserted into the cylinder hole through the cutout, and the top end of the axis is fitted into the slotted hole of the piston and is secured. Thus, the piston and finger are mutually linked.

However, the structure in which the pistons and fingers are mutually linked with axes through a plurality of cutouts formed in the front surface of a casing as in this opening and closing chuck is problematic in that machining of the casing is complex because the casing must be subjected to a drilling process, the plurality of cutouts lower the strength of the casing, and foreign matter such as dust enters the cylinder holes through the cutouts, causing the pistons to be likely to malfunction due to the foreign matter.

CITATION LIST

Patent Literature

[PTL 1] Japanese Unexamined Patent Application Publication No. 9-295293

SUMMARY OF INVENTION

Technical Problem

An object of the present invention is to structure an opening and closing chuck that has a pair of fingers opened and closed by being moved along a guide rail so that pistons of cylinder apparatuses and the fingers are mutually linked without forming cutouts in the casing and that the pistons do not malfunction due to foreign matter such as dust.

Solution to Problem

To achieve the above object, in the opening and closing chuck in the present invention: a guide rail, which is linear, is provided on an outer surface of a chuck body, a pair of fingers that grasp a workpiece is provided on the guide rail, and at least one of the pair of fingers is a movable finger that is movable along the guide rail; the movable finger includes a rail fitting groove into which the guide rail fits, a first concave groove is formed in right and left side surfaces of the guide rail and a second concave groove is formed in inner surfaces of right and left side walls of the rail fitting grooves, the first concave groove on the same side as the guide rail and the second concave groove on the same side as the rail fitting grooves being at positions at which the first concave groove and the second concave groove face each other, a rolling element is provided between the first concave groove and the second concave groove, and the movable finger is movable along the guide rail due to rolling of the rolling element; as many cylinder apparatuses as there are movable fingers are provided in the chuck body, each cylinder apparatus including a piston and a rod that advance and retract by an action of air pressure in directions of an axial line of a cylinder hole, a top end of the rod extends from an end of the chuck body to an outside, and an end block, which faces the end of the chuck body, is attached to the top end of the rod so as to move toward and away from the end of the chuck body according to forward and backward movements of the rod; and the movable finger is linked to the end block, and opening and closing of the movable finger is driven by the rod through the end block.

In the present invention, it is desirable for the guide rail to be formed separately from the chuck body and be fixed to an outer surface of the chuck body. It is also desirable for at least one of both ends of the guide rail in the longitudinal direction to extend from the chuck body to within the movable range of the end block. It is also desirable for a clearance hole, into which the one end of the guide rail fits, to be formed in the end block.

It is also desirable for the end of the guide rail to remain fitting into the clearance hole regardless of the operation position of the end block.

In addition, a convex part, which fits to the first concave groove in the guide rail, may be formed on the right and left side walls of the clearance hole. In this case, the position at which the convex part is formed is the end of the clearance hole on the same side as the movable finger. Furthermore, the convex part can have a stopper function that prevents the rolling element from coming off the first concave groove and the second concave groove.

According to one specific structure aspect of the present invention; two cylinder apparatuses, first cylinder apparatus and second cylinder apparatus, are provided in the chuck body; a first rod linked to a first piston in the first cylinder apparatus extends from a first end in the chuck body to the outside, and a second rod linked to a second piston in the second cylinder apparatus extends from a second end, opposite to the first end, in the chuck body to the outside; a first end block is attached to the first rod, and a second end block is attached to the second rod; and each of the pair of fingers is a movable finger, the first finger being linked to the first end block, the second finger being linked to the second end block.

In this case, the opening and closing chuck may be structured so that the first cylinder apparatus and the second cylinder apparatus operate independently in an asynchronous manner and that the first finger and the second finger also open and close independently in an asynchronous manner.

The second piston may have a larger diameter than the first piston, and a stop position adjustment mechanism that adjusts the stop position of the second end block may be disposed on the second end block attached to the second rod. In this case, it is desirable for the stop position adjustment mechanism to be structured so that it includes an adjustment bolt, the adjustment bolt being screwed into a screw hole formed in the second end block so as to make the forward and backward movements of the adjustment bolt adjustable in a direction parallel to the axial line, and that when the top end of the adjustment bolt abuts an end surface of the chuck body, a stop position of the second end block is determined.

Alternatively, the first finger and the second finger may be structured so as to open and close synchronously by being linked to one end and another end of a swinging arm that is swingable with a center of the swinging arm acting as a fulcrum.

According to another specific structure aspect of the present invention; one cylinder apparatus is provided in the chuck body; one of the pair of fingers is a movable finger and another one is a fixed finger; the fixed finger is fixed to the guide rail by inserting a fixing bolt into a bolt insertion hole formed in the fixed finger and screwing the fixing bolt into a screw hole formed in the guide rail, the bolt insertion hole being a hole that is long in the longitudinal direction of the guide rail, a fixing position of the fixed finger being adjustable in the longitudinal direction of the guide rail within a length of the bolt insertion hole.

Advantageous Effects of Invention

According to the present invention, end blocks are attached to rods extending from ends of a chuck body and fingers are linked to the end blocks. Unlike the known opening and closing chuck, therefore, there is no need to form, in the chuck body, a plurality of cutouts through which an axis that mutually links a piston and a finger passes or form a long linking hole used to secure the axis to the piston. Therefore, the mechanism that mutually links the piston and finger is simple. Furthermore, since dust does not enter the cylinder hole, the piston does not malfunction due to dust.

DESCRIPTION OF EMBODIMENTS

FIGS. 1 to 7 illustrate a first embodiment of the opening and closing chuck according to the present invention. The opening and closing chuck 1A in the first embodiment is an asynchronous operation type of opening and closing chuck, in which two fingers 2a and 2b are opened and closed independently in an asynchronous manner, and is also an equal-thrust type of opening and closing chuck, in which equal grasping force (thrust) is exerted on the two fingers 2a and 2b.

Figure 1:
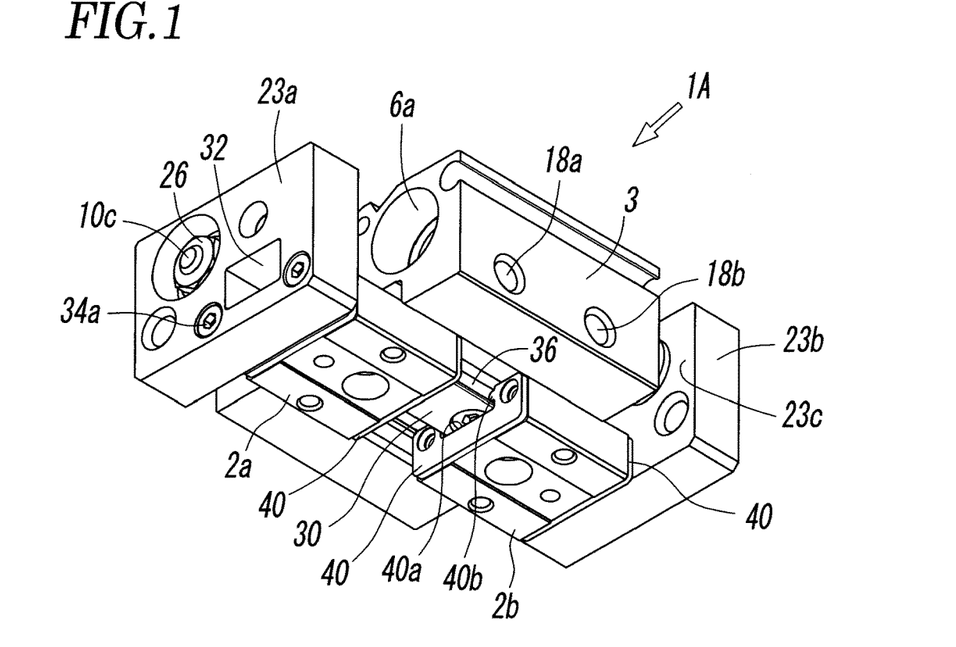
FIG. 1 is a perspective view of a first embodiment of the opening and closing chuck according to the present invention, illustrating a state in which a pair of fingers is open.
Figure 3:
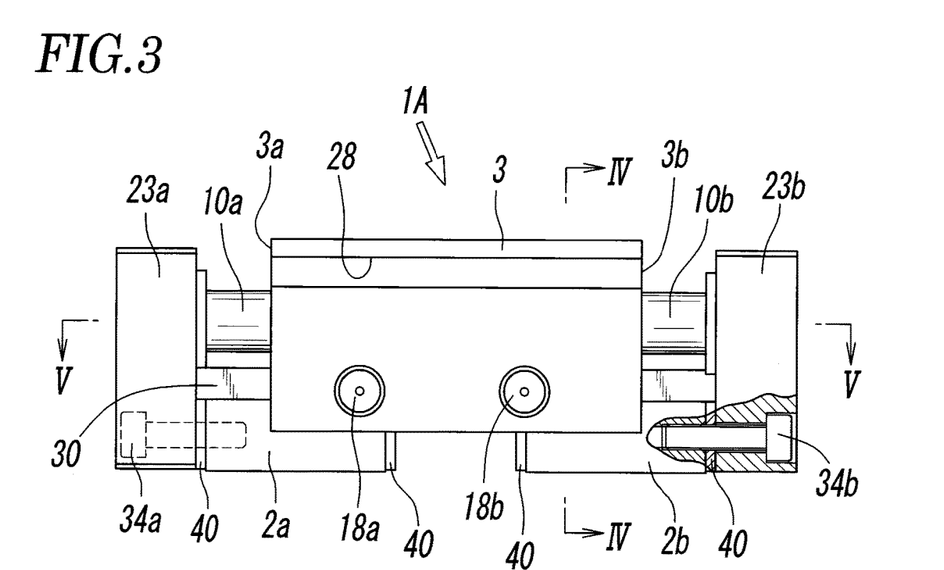
FIG. 3 is a front view in which part of the opening and closing chuck in FIG. 1 is cut.

The opening and closing chuck 1A has a chuck body 3 that has a substantially rectangular block shape in a plan view. In the chuck body 3, two cylinder apparatuses, first cylinder apparatus 4a and second cylinder apparatus 4b, are provided in parallel. That is, in the chuck body 3, a first cylinder hole 6a and a second cylinder hole 6b are formed in parallel so as to extend from a first end 3a of the chuck body 3 to a second end 3b opposite to the first end 3a.

Figure 5:
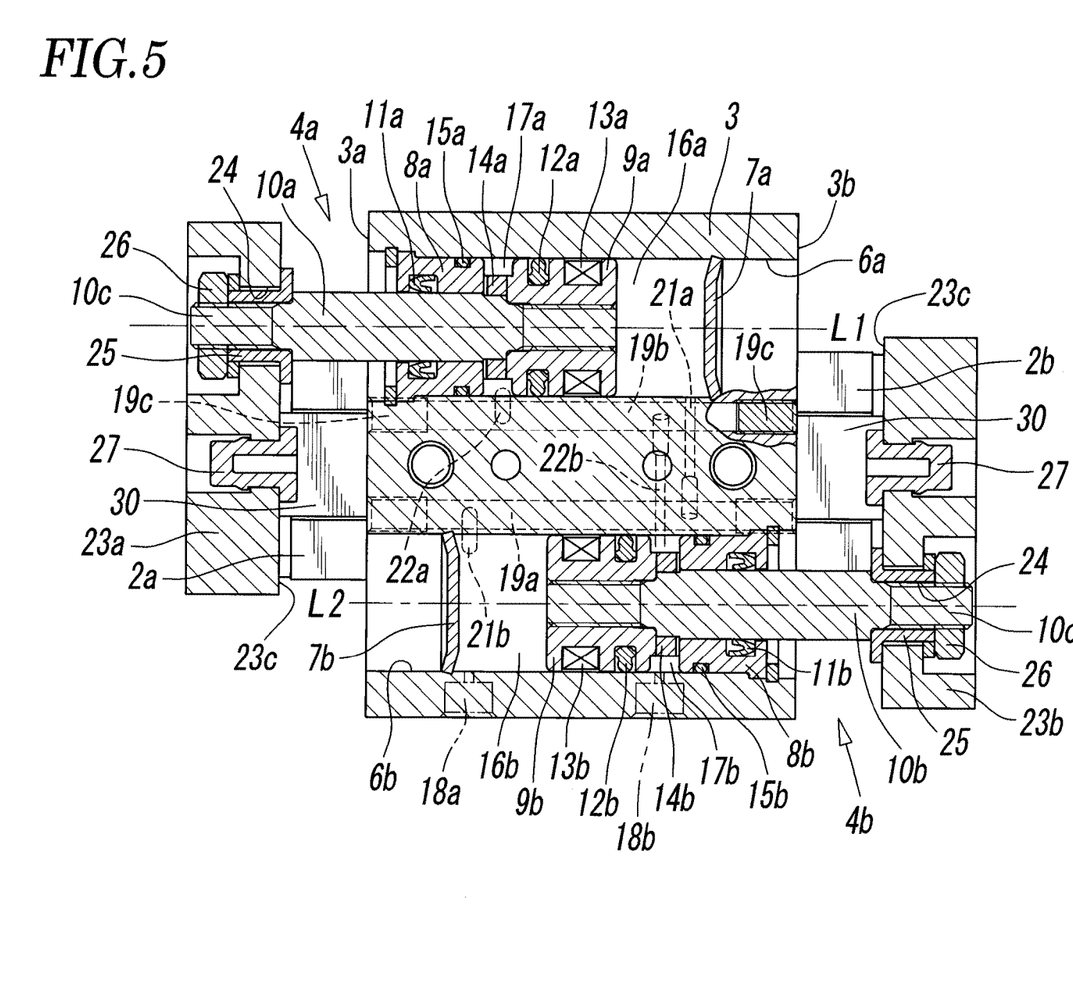
FIG. 5 is a cross-sectional view taken along line V-V in FIG. 3.

As illustrated in FIG. 5, a first piston 9a is accommodated in a piston chamber in the first cylinder hole 6a, the piston chamber being defined between a shielding plate 7a, which blocks an end on the same side as the second end 3b, and a rod cover 8a, which blocks an end on the same side as the first end 3a, so as to be slidable in the direction of the axial line L1 of the first cylinder hole 6a, and a second piston 9b is accommodated in a piston chamber in the second cylinder hole 6b, the piston chamber being defined between a shielding plate 7b, which blocks an end on the same side as the first end 3a, and a rod cover 8b, which blocks an end on the same side as the second end 3b, so as to be slidable in the axial direction L2 of the second cylinder hole 6b. The first piston 9a and second piston 9b have the same diameter.

Since the axial line L1 of the first cylinder hole 6a and the axial line L2 of the second cylinder hole 6b are parallel to each other, the two axial lines L1 and L2 will be collectively referred to as the axial line L in descriptions below, except when they need to be distinguished.

The bottom end of a first rod 10a is linked to the first piston 9a. The top end of the first rod 10a hermetically passes through the rod cover 8a with the intervention of a rod packing 11a so as to be slidable, and extends toward the same side as the first end 3a of the chuck body 3. The bottom end of a second rod 10b is linked to the second piston 9b. The top end of the second rod 10b hermetically passes through the rod cover 8b with the intervention of a rod packing 11b so as to be slidable, and extends toward the same side as the second end 3b of the chuck body 3.

In the drawing, the reference character 12a indicates a piston packing, attached around the outer circumference of the piston 9a, that creates a seal between the outer circumference of the piston 9a and the inner circumference of the cylinder hole 6a, the reference character 12b indicates a piston packing, attached around the outer circumference of the piston 9b, that creates a seal between the outer circumference of the piston 9b and the inner circumference of the cylinder hole 6b, the reference characters 13a and 13b each indicate a magnet that is a position detecting specimen, the magnet 13a being attached to the outer circumference of the piston 9a, the magnet 13b being attached to the outer circumference of the piston 9b, the reference characters 14a and 14b each indicate a damper, the damper 14a being attached to the piston 9a, the damper 14b being attached to the piston 9b, and the reference characters 15a and 15b each indicate an O-ring, the O-ring 15a creating a seal between the outer circumference of the rod cover 8a and the inner circumference of the cylinder hole 6a, the O-ring 15b creating a seal and between the outer circumference of the rod cover 8b and the inner circumference of the cylinder hole 6b.

A first head-side pressure chamber 16a and a first rod-side pressure chamber 17a are formed at both ends of the first piston 9a, and a second head-side pressure chamber 16b and a second rod-side pressure chamber 17b are formed at both ends of the second piston 9b. The placement of the first head-side pressure chamber 16a and first rod-side pressure chamber 17a in the direction of the axial line L1 and the placement of the second head-side pressure chamber 16b and second rod-side pressure chamber 17b in the direction of the axial line L2 are opposite to each other between the two pistons 9a and 9b. That is, the first head-side pressure chamber 16a is formed between the first piston 9a and the shielding plate 7a, and the first rod-side pressure chamber 17a is formed between the first piston 9a and the rod cover 8a. Similarly, the second head-side pressure chamber 16b is formed between the second piston 9b and the shielding plate 7b, and the second rod-side pressure chamber 17b is formed between the second piston 9b and the rod cover 8b.

A first port 18a and a second port 18b are formed on a side surface, of the chuck body 3, that face a direction orthogonal to the axial line L. The first port 18a communicates with the first head-side pressure chamber 16a and first rod-side pressure chamber 17a through a first flow path hole 19a formed in the chuck body 3, and the second port 18b communicates with the second head-side pressure chamber 16b and second rod-side pressure chamber 17b through a second flow path hole 19b formed in the chuck body 3. That is, the first flow path hole 19a and second flow path hole 19b are formed between the first cylinder hole 6a and the second cylinder hole 6b in parallel to the first cylinder hole 6a and second cylinder hole 6b and to each other. The first flow path hole 19a communicates with the first port 18a through a communicating path (not illustrated) and also communicates with the first head-side pressure chamber 16a through a first head-side communicating hole 21a and with the second head-side pressure chamber 16b through a second head-side communicating hoe 21b. The second flow path hole 19b communicates with the second port 18b through a communicating path (not illustrated) and also communicates with the first rod-side pressure chamber 17a through a first rod-side communicating hole 22a and with the second rod-side pressure chamber 17b through a second rod-side communicating hoe 22b. The reference character 19c in the drawing indicates one of plugs that block both ends of the flow path holes 19a and 19b.

Therefore, when compressed air is supplied to the first port 18a and the second port 18b is opened to the atmosphere, the compressed air is supplied to the first head-side pressure chamber 16a and second head-side pressure chamber 16b through the first flow path hole 19a and the first rod-side pressure chamber 17a and second rod-side pressure chamber 17b are opened to the atmosphere through the second flow path hole 19b, as illustrated in FIG. 5, so the first rod 10a and second rod 10b retract (expansion occurs) due to the backward movement of the pistons 9a and 9b in the two cylinder apparatuses 4a and 4b. Conversely, when the first port 18a is opened to the atmosphere and compressed air is supplied to the second port 18b, the first head-side pressure chamber 16a and second head-side pressure chamber 16b are opened to the atmosphere through the first flow path hole 19a and the compressed air is supplied to the first rod-side pressure chamber 17a and second rod-side pressure chamber 17b through the second flow path hole 19b, so the first rod 10a and second rod 10b advance (contraction occurs) due to the forward movement of the pistons 9a and 9b in the two cylinder apparatuses 4a and 4b.

The forward and backward movements of the first rod 10a and second rod 10b at that time are not performed synchronously but are performed independently in an asynchronous manner. The magnitudes of forces exerted on the first rod 10a and second rod 10b are the same because the first piston 9a and second piston 9b have the same diameter.

A first end block 23a is attached to the top end of the first rod 10a, and a second end block 23b is attached to the top end of the second rod 10b. The end blocks 23a and 23b, which have a substantially rectangular shape in a side view when viewed in the direction of the axial line L, are disposed so that the inner end surfaces 23c of the first end block 23a faces the first end 3a of the chuck body 3 in parallel and the inner end surfaces 23c of the second end block 23b faces the second end 3b of the chuck body 3 in parallel. Ends of these rods 10a and 10b are respectively inserted into rod attachment holes 24 formed in the end blocks 23a and 23b through floating bushes 25. A nut 26 is then screwed on a screw part 10c formed at each of the ends of the rods 10a and 10b, respectively fixing the end blocks 23a and 23b to the rods 10a and 10b. Therefore, the end blocks 23a and 23b are displaced toward and away from the end surfaces of the chuck body 3 according to the forward and backward movements of the rods 10a and 10b.

An end damper 27, which is formed with a synthetic rubber, a synthetic resin, or the like and is elastic, is attached to the inner end surface 23c of the end blocks 23a and 23b. When the rods 10a and 10b advance as far as they will go, that is, the rods 10a and 10b reach at their forward stroke ends, the end damper 27 abuts the relevant end surface of the chuck body 3. The backward stroke end of the rod 10a is a position at which the damper 14a attached to the piston 9a abuts the rod cover 8a, as illustrated in FIG. 5; similarly, the backward stroke end of the rod 10b is a position at which the damper 14b attached to the piston 9b abuts the rod cover 8b.

The operation position of the first piston 9a can be detected by attaching a positional sensor (not illustrated) to the inside of an attachment groove 28 formed in a side surface of the chuck body 3 and detecting the magnet 13a attached to the first piston 9a; similarly, the operation position of the second piston 9b can be detected by attaching a positional sensor (not illustrated) to the inside of another attachment groove 28 formed in the side surface of the chuck body 3 and detecting the magnet 13b attached to the second piston 9b.

A guide rail 30, which is linear, is provided at the central position of an outer surface (the bottom surface in FIG. 1) of the chuck body 3 in parallel to the axial line L of the cylinder holes 6a and 6b. The guide rail 30, having a substantially rectangular cross section, is formed separately from the chuck body 3 and is fixed to the chuck body 3 with screws 31. One end of the guide rail 30 in its longitudinal direction extends from the first end 3a of the chuck body 3 to within the movable range of the first end block 23a, and the other end of the guide rail 30 in its longitudinal direction extends from the second end 3b of the chuck body 3 to within the movable range of the second end block 23b. To avoid a collision with the guide rail 30, a clearance hole 32, which is rectangular and into which one end of the guide rail 30 fit, is formed in each of the end blocks 23a and 23b.

Figure 6:
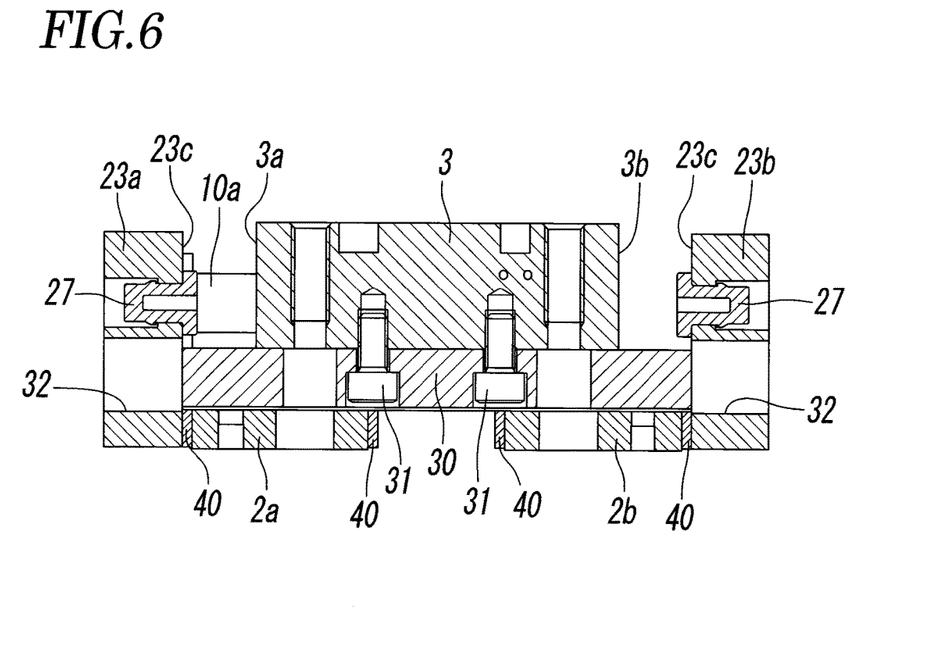
FIG. 6 is a cross-sectional view taken along line VI-VI in FIG. 4.

The length by which the guide rail 30 extends from each end of the chuck body 3 is preferably such that each end of the guide rail 30 remains fitting into the clearance hole 32 regardless of the operation positions of the rods 10a and 10b, that is, end blocks 23a and 23b. A state in which the end of the guide rail 30 is fitted into the clearance hole 32 includes a state in which the end of the guide rail 30 is located at the same position as the end of the clearance hole 32 as illustrated in FIG. 6.

The first finger 2a and second finger 2b, which are formed with a member having a rectangular shape in a plan view, are placed on the guide rail 30. Since the guide rail 30 fits into rail fitting grooves 33 formed in the first finger 2a and second finger 2b, they are movable along the guide rail 30 in a state in which the first finger 2a and second finger 2b are placed across the guide rail 30. The first finger 2a is linked to the first end block 23a with fixing screws 34a in a state in which one end of the finger 2a abuts the inner end surface 23c of the first end block 23a. The second finger 2b is linked to the second block 23b with fixing screws 34b in a state in which one end of the finger 2b abuts the inner end surface 23c of the second end block 23b.

Figure 4:
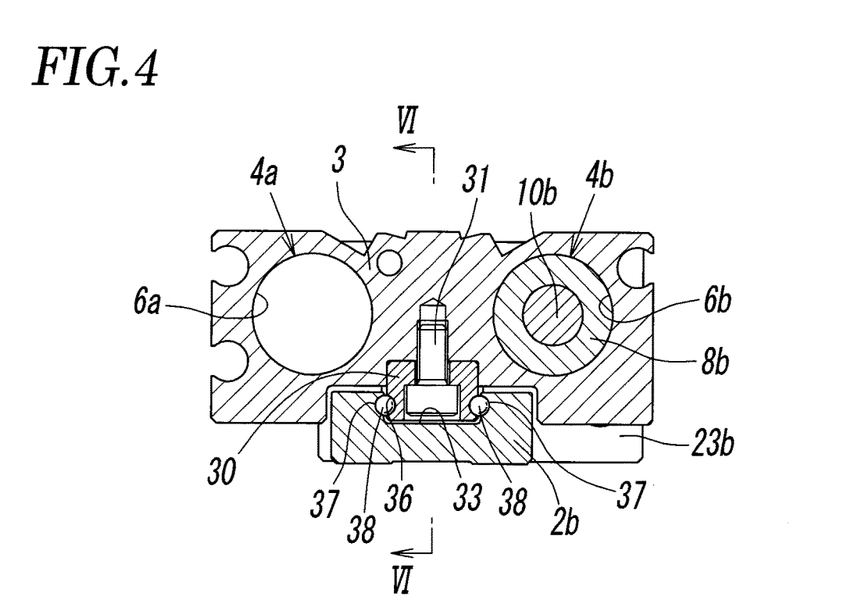
FIG. 4 is a cross-sectional view taken along line IV-IV in FIG. 3.
Figure 7:
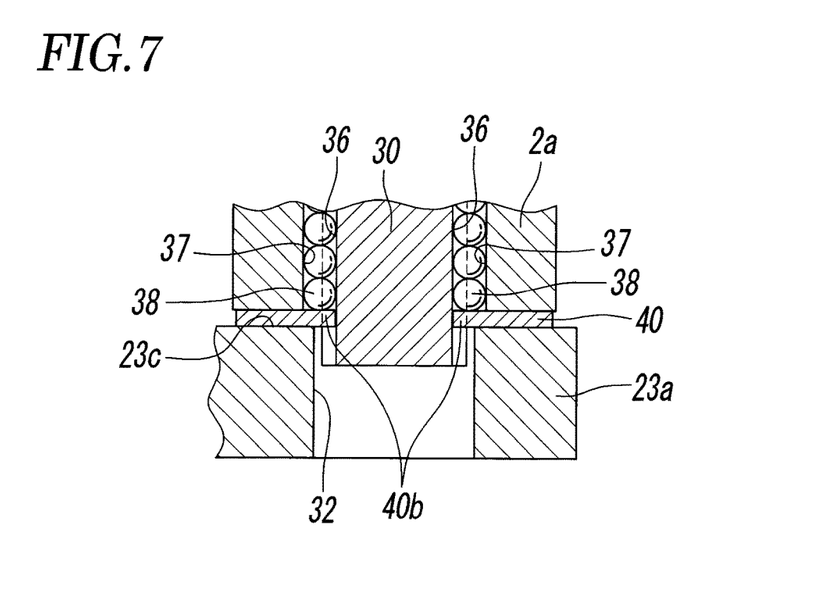
FIG. 7 is a partial cutaway plan view in which an end block, a movable finger, and a guide rail are cut at the position of a clearance hole.

To make the fingers 2a and 2b movable along the guide rail 30, as seen from FIGS. 4 and 7, first concave grooves 36, each of which is arc-shaped and extends in the longitudinal direction of the guide rail 30, are formed on the right and left side surfaces of the guide rail 30, second concave grooves 37, each of which is arc-shaped and extends in the longitudinal direction of the rail fitting grooves 33, are formed on the inner surfaces of the right and left side walls in the rail fitting grooves 33 in the fingers 2a and 2b so as to face the first concave grooves 36, and rolling elements 38, each of which is formed with a steel ball, are provided so as to intervene between the first concave groove 36 and the second concave groove 37. Due to the rolling of the rolling elements 38, the fingers 2a and 2b become movable along the guide rail 30. Therefore, it can also be said that the first finger 2a and second finger 2b are movable fingers that can move along the guide rail 30.

Since the piston 9a, rod 10a, end block 23a and finger 2a advance and retract together and the piston 9b, rod 10b, end block 23b and finger 2b advance and retract together, their operation strokes are the same.

At both ends of each of the fingers 2a and 2b in the direction of the axial line L, stoppers 40, which have a plate shape similar to the end surface shapes of the fingers 2a and 2b, are attached to prevent the rolling elements 38 coming off the second concave grooves 37. As seen from FIGS. 1 and 7, the stopper 40 has convex parts 40b, each of which is arc-shaped and is fitted into the relevant first concave groove 36 in the guide rail 30, on the inner surfaces of the right and left side walls of a concave part 40a into which the guide rail 30 is fitted. One end of the fingers 2a and 2b is linked to the inner end surface 23c of the end block 23a or 23b, whichever is applicable, through the stopper 40 with the one end abutting the inner end surfaces 23c.

In FIG. 7, the end block 23a (23b), movable finger 2a, and guide rail 30 are cut at the position of the clearance hole 32. As an aid to comprehension of the drawing, however, the guide rail 30 is more deeply inserted into the clearance hole 32 than in FIG. 6.

In the opening and closing chuck 1A, structured as described above, in the first embodiment, when, as described above, compressed air is supplied to the first port 18a and the second port 18b is opened to the atmosphere and thereby the first rod 10a of the first cylinder apparatus 4a and the second rod 10b of the second cylinder apparatus 4b retract as illustrated in FIG. 5, the first finger 2a and second finger 2b also retract, so the space therebetween thereby expands, as illustrated in FIG. 1.

Figure 2:
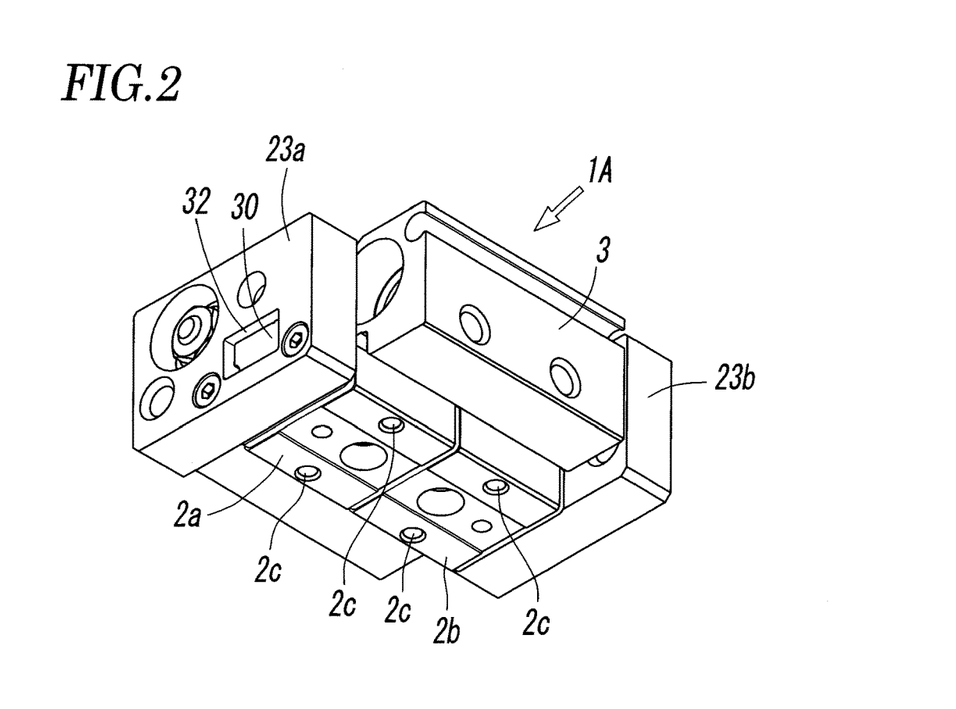
FIG. 2 is a perspective view as in FIG. 1, illustrating a state in which the pair of fingers is closed.

Conversely, when the first port 18a is opened to the atmosphere and compressed air is supplied to the second port 18b and thereby the first rod 10a and second rod 10b advance, the first finger 2a and second finger 2b also advance as illustrated in FIG. 2, so the space therebetween thereby narrows. Therefore, a workpiece is grasped between the first finger 2a and second finger 2b.

In this case, the opening and closing operation of the first finger 2a and that of the second finger 2b are not performed synchronously, but are performed independently in an asynchronous manner. A grasping force (thrust) exerted on the first finger 2a and that exerted on the second finger 2b are equal to each other. Therefore, the opening and closing chuck 1A can reliably grasp not only workpieces that are regularly placed with their central positions aligned but also workpieces that are irregularly placed with their central positions displaced and workpieces with different sizes.

There may be a case in which the opening and closing chuck 1A cannot directly grasp a workpiece with the fingers 2a and 2b depending on its shape and size. In this case, attachments suitable to the target workpiece are attached by using attachment holes 2c formed in the fingers 2a and 2b, and the workpiece is held with the attachments.

The opening and closing chuck 1A has a structure in which the end blocks 23a and 23b are respectively attached to the rods 10a and 10b extending from the ends of the chuck body 3 and the fingers 2a and 2b are respectively linked to the end blocks 23a and 23b. Unlike the known opening and closing chuck, therefore, there is no need to form, in a chuck body, a cutout through which an axis that mutually links a piston and a finger passes or form a long linking hole used to secure the axis to the piston. Therefore, the mechanism that mutually links the piston and finger is simple. There is also the advantage that since dust does not enter the cylinder hole, the piston does not malfunction due to dust.

Figure 8:
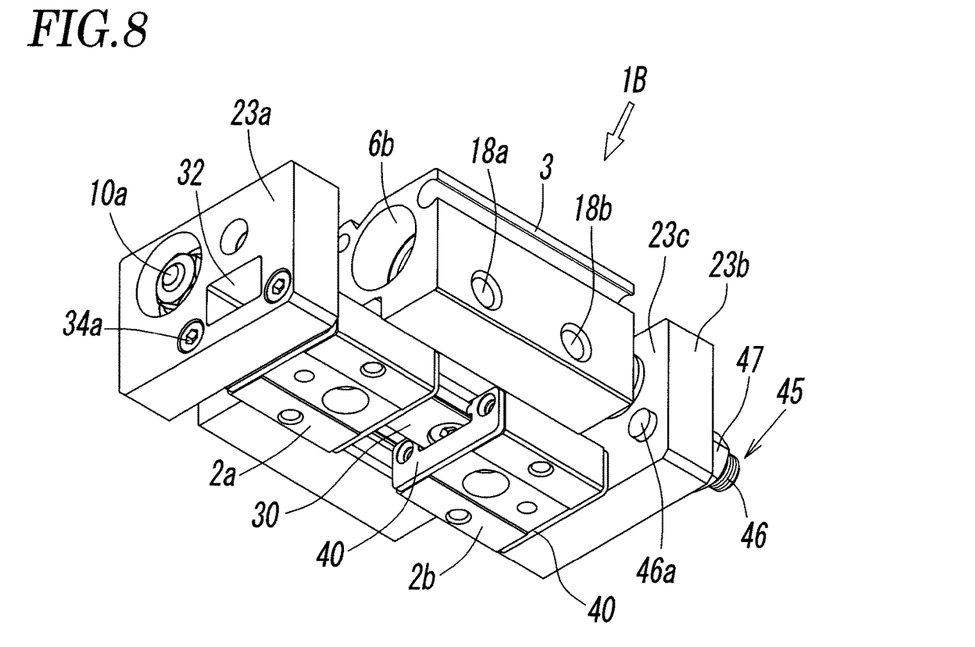
FIG. 8 is a perspective view of a second embodiment of the opening and closing chuck according to the present invention.
Figure 9:
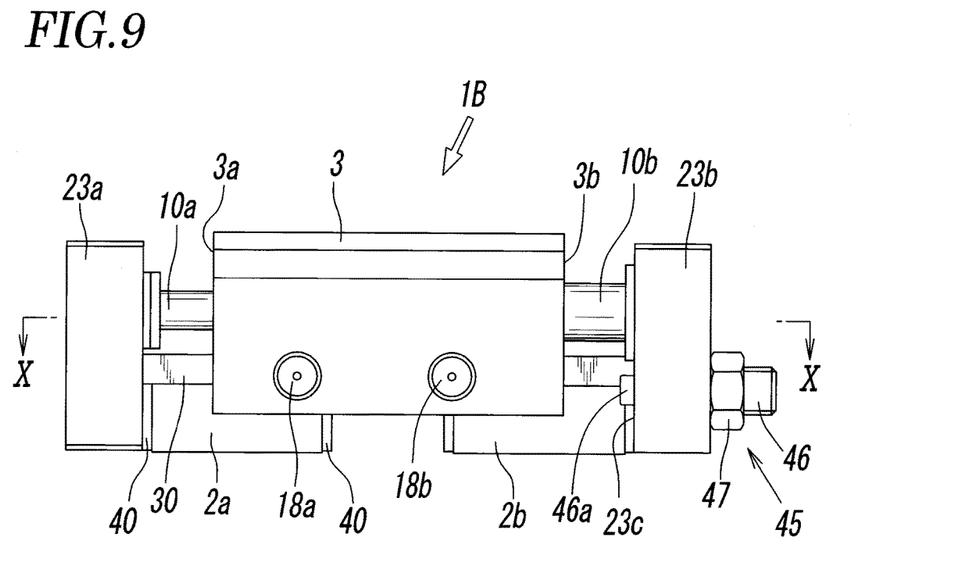
FIG. 9 is a front view of the opening and closing chuck in FIG. 8.
Figure 10:
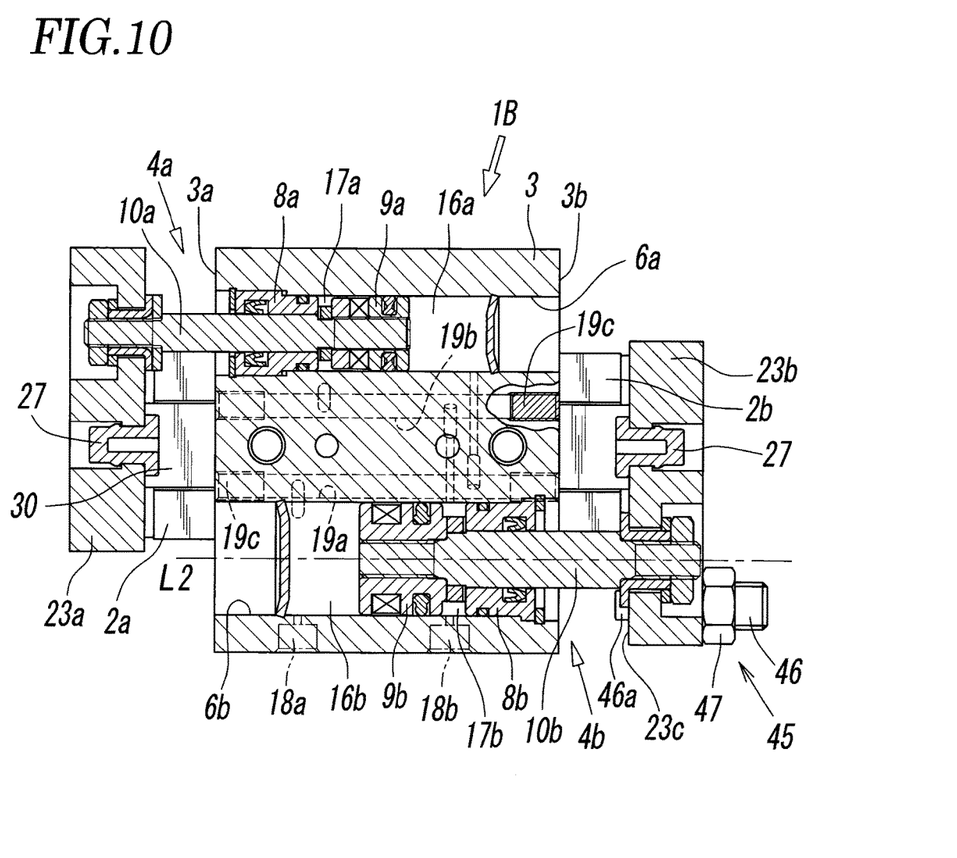
FIG. 10 is a cross-sectional view taken along line X-X in FIG. 9.

FIGS. 8 to 10 illustrate a second embodiment of the opening and closing chuck according to the present invention. The opening and closing chuck 1B in the second embodiment is an asynchronous operation type of opening and closing chuck, in which two fingers 2a and 2b are opened and closed independently in an asynchronous manner, and is also a different-thrust type of opening and closing chuck, in which different grasping forces (thrusts) are exerted on the two fingers 2a and 2b.

The opening and closing chuck 1B in the second embodiment differs from the opening and closing chuck 1A in the first embodiment in that the second piston 9b has a larger diameter than the first piston 9a and a stop position adjustment mechanism 45 that adjusts the stop position of the second end block 23b is attached to the second end block 23b. Other arrangements of the opening and closing chuck 1B are essentially the same as in the opening and closing chuck 1A in the first embodiment. Therefore, only arrangements of the opening and closing chuck 1B that differ from the opening and closing chuck 1A will be described below. Main components in other arrangements will be denoted by the same reference characters as in the opening and closing chuck 1A in the first embodiment and their descriptions will be omitted.

As seen from FIG. 10, in the opening and closing chuck 1B, the second cylinder hole 6b and second piston 9b in the second cylinder apparatus 4b of the two cylinder apparatuses, first cylinder apparatus 4a and second cylinder apparatus 4b, have a larger diameter than the first cylinder hole 6a and first piston 9a in the first cylinder apparatus 4a. Accordingly, the second rod 10b, the rod cover 8b, and the like also have a larger diameter than the first rod 10a, the rod cover 8a, and the like.

The stop position adjustment mechanism 45 is attached to the second end block 23b linked to the second rod 10b. The stop position adjustment mechanism 45 includes an adjustment bolt 46. The adjustment bolt 46 is screwed into a screw hole formed in the second end block 23b so as to make the forward and backward movements of the adjustment bolt 46 adjustable in a direction parallel to the axial line L in a state in which the top end 46a of the adjustment bolt 46 extends from the inner end surface 23c of the second end block 23b. The adjustment bolt 46 is fixed with a fixing nut 47. When the top end 46a of the adjustment bolt 46 abuts the end surface of the second end 3b of the chuck body 3, the stop position of the second end block 23b is set. The setting of the stop position of the second end block 23b with the stop position adjustment mechanism 45 has the same effect as the setting of the stop position of the second finger 2b linked to the second end block 23b.

When the opening and closing chuck 1B structured as described above grasps a workpiece with the first finger 2a and second finger 2b, in a state illustrated in FIGS. 8 to 11 in which the first finger 2a and second finger 2b are at their backward stroke ends, the first port 18a is opened to the atmosphere and compressed air is supplied to the second port 18b. Then, the first head-side pressure chamber 16a and second head-side pressure chamber 16b are opened to the atmosphere through the first flow path hole 19a and compressed air is supplied to first rod-side pressure chamber 17a and second rod-side pressure chamber 17b through the second flow path hole 19b and thereby the first finger 2a and second finger 2b advance, so the workpiece is grasped by the two fingers 2a and 2b. Since the second piston 9b has a larger diameter than the first piston 9a, the thrust of the second finger 2b driven by the second piston 9b is larger than the thrust of the first finger 2a driven by the first piston 9a, so the second finger 2b advance to a position at which the top end 46a of the adjustment bolt 46 remains abutting the end surface of the chuck body 3 and stops at that position. The workpiece is grasped by the two fingers 2a and 2b at the position.

Figure 11:
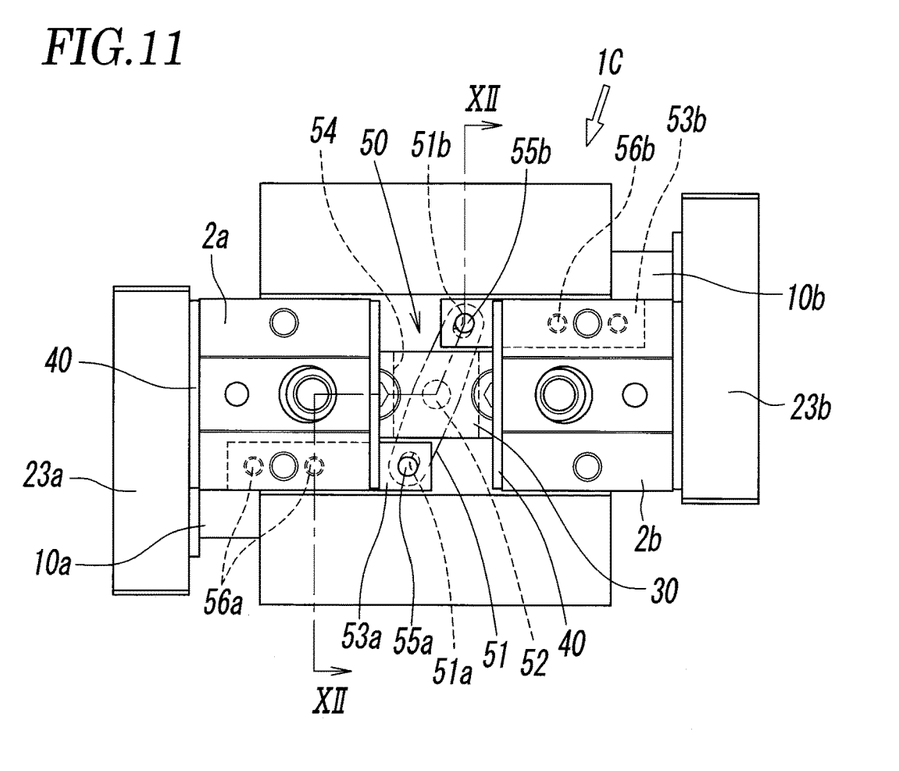
FIG. 11 is a bottom view of a third embodiment of the opening and closing chuck according to the present invention.
Figure 12:
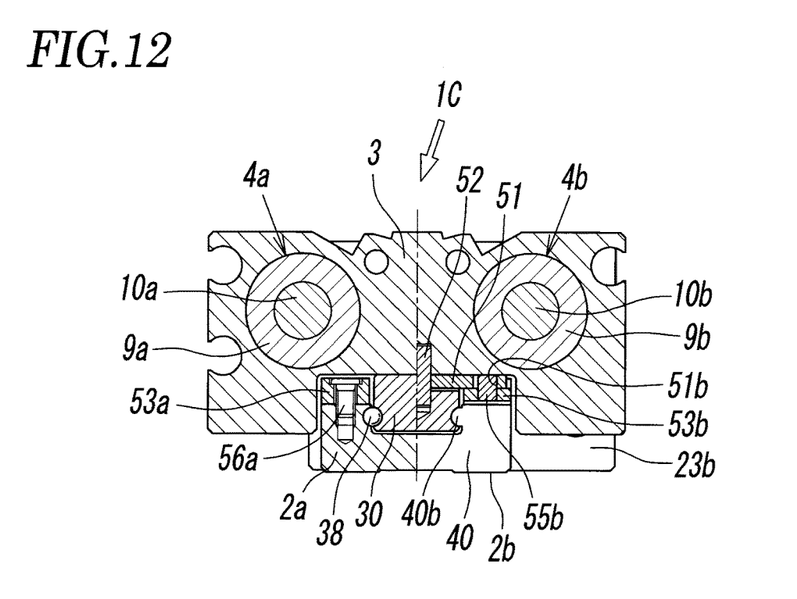
FIG. 12 is a cross-sectional view taken along line XII-XII in FIG. 11.

FIGS. 11 and 12 illustrate a third embodiment of the opening and closing chuck according to the present invention. The opening and closing chuck 1C in the third embodiment is a synchronous operation type of opening and closing chuck, in which two fingers 2a and 2b are opened and closed synchronously, and is also an equal-thrust type of opening and closing chuck, in which an equal grasping force (thrust) is exerted on the two fingers 2a and 2b.

The opening and closing chuck 1C in the third embodiment differs from the opening and closing chuck 1A in the first embodiment in that a synchronizing mechanism 50 is provided that synchronizes the two fingers, first finger 2a and second finger 2b. Other arrangements of the opening and closing chuck 1C are essentially the same as in the opening and closing chuck 1A in the first embodiment. Therefore, only arrangements of the opening and closing chuck 1C that differ from the opening and closing chuck 1A will be described below. Main components in other arrangements will be denoted by the same reference characters as in the opening and closing chuck 1A in the first embodiment and their descriptions will be omitted.

The synchronizing mechanism 50, formed in the opening and closing chuck 1C, has a swinging arm 51, having a narrow plate shape, that is swingable around a fulcrum pin 52 provided at the center of the chuck body 3, and also has a pair of linking members 53a and 53b, which links one end of the swinging arm 51 to the first finger 2a and links its other end to the second finger 2b.

The swinging arm 51 is disposed in a space 54 formed in the central portion of the guide rail 30 in an orientation in which one end of the swinging arm 51 extends toward one side (first side surface side) in the width direction of the guide rail 30 and the other end extends toward the other side (second side surface side) in the width direction of the guide rail 30. Linking holes 51a and 51b are formed at these ends.

The first linking member 53a, which is one of the pair of linking members 53a and 53b, is attached to the first side surface side in parallel to the guide rail 30. The second linking member 53b, which is the other of the pair, is attached to second side surface side in parallel to the guide rail 30. One end of the first linking member 53a is rotatably linked to the linking hole 51a at one end of the swinging arm 51 with a linking pin 55a. The other end of the linking member 53a is fixed to the button surface of the first finger 2a with screws 56a. One end of the second linking member 53b is rotatably linked to the linking hole 51b at the other end of the swinging arm 51 with a linking pin 55b. The other end of the linking member 53b is fixed to the button surface of the second finger 2b with screws 56b.

Since the opening and closing chuck 1C in the third embodiment is structured as described above, when the first rod 10a and second rod 10b advance and retract due to the operation of the two cylinder apparatuses 4a and 4b, the first finger 2a and second finger 2b are opened and closed synchronously due to the swinging motion of the swinging arm 51 and the pair of linking members 53a and 53b.

Figure 13:
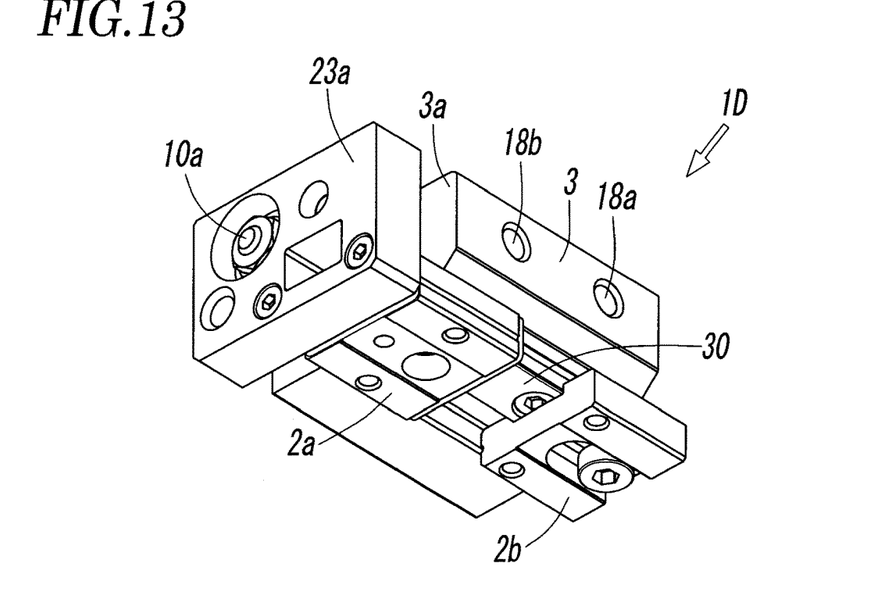
FIG. 13 is a perspective view of a fourth embodiment of the opening and closing chuck according to the present invention.
Figure 14:
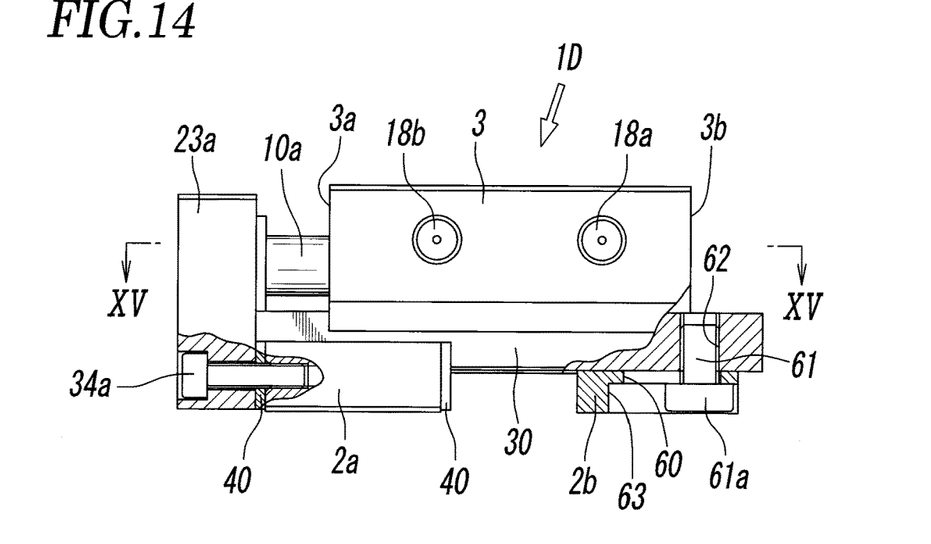
FIG. 14 is a partial cutaway front view of the opening and closing chuck in FIG. 13.
Figure 15:
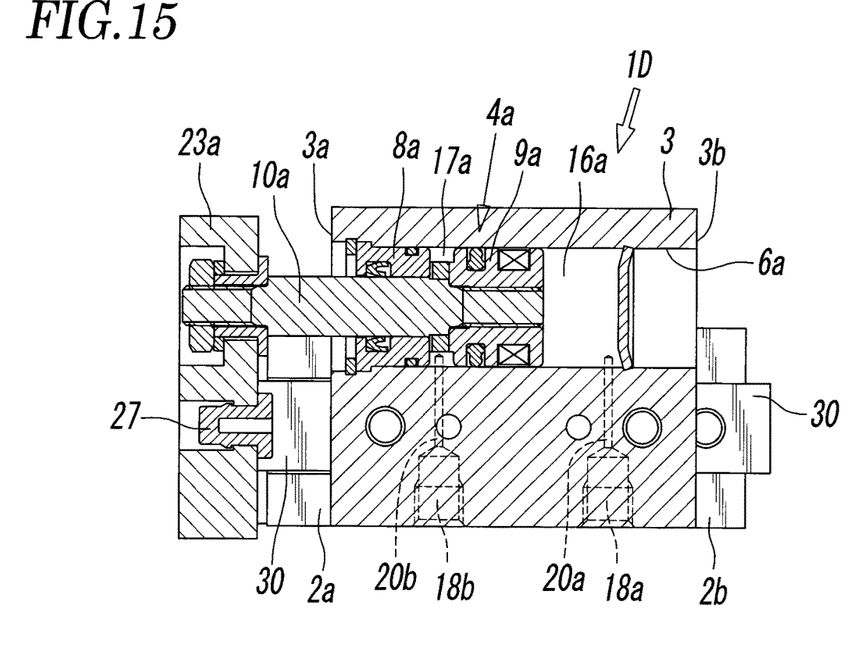
FIG. 15 is a cross-sectional view taken along line XV-XV in FIG. 14.

FIGS. 13 to 15 illustrate a fourth embodiment of the opening and closing chuck according to the present invention. The opening and closing chuck 1D in the fourth embodiment is a one-finger-fixed type of opening and closing chuck, in which one of a pair of fingers 2a and 2b is fixed to the guide rail 30 and the other is movable along the guide rail 30.

In the opening and closing chuck 1D in this fourth embodiment, only one cylinder apparatus 4a is provided in the chuck body 3. The first finger 2a, which is one of the pair of finger 2a and finger 2b, is a movable finger that moves along the guide rail 30, and the second finger 2b, which is the other of the pair, is a fixed finger, which is fixed to the guide rail 30.

The rod 10a of the cylinder apparatus 4a, which extends on the same side as the first end 3a of the chuck body 3, is linked to the first finger 2a through the first end block 23a and causes the first finger 2a to advance and retract along the guide rail 30. The structure in which the first finger 2a is advanced and retracted by the cylinder apparatus 4a in this way is essentially the same as the structure in the opening and closing chuck 1A in the first embodiment in which the first finger 2a is advanced and retracted by the first cylinder apparatus 4a, so main components in this embodiment that are the same as in the first embodiment will be denoted by the same reference characters as in the first embodiment and their descriptions will be omitted.

To fix the second finger 2b to the guide rail 30, a fixing bolt 61 is inserted into a bolt insertion hole 60 formed in the second finger 2b and is then screwed into a screw hole 62 formed in the guide rail 30. The bolt insertion hole 60 is a hole that is long in the longitudinal direction of the guide rail 30; the fixing position of the second finger 2b can be adjusted in the longitudinal direction of the guide rail 30 within the length of the bolt insertion hole 60. A concave stepped part 63 is formed in the second finger 2b. When the fixing bolt 61 is screwed in the concave stepped part 63, the head 61a of the fixing bolt 61 does not protrude to the outside of the second finger 2b.

Of the first port 18a and second port 18b formed in a side surface of the chuck body 3, the first port 18a communicates directly with the head-side pressure chamber 16a of the cylinder apparatus 4a through a first port communicating path 20a and the second port 18b communicates directly with the rod-side pressure chamber 17a through a second port communicating path 20b.

When compressed air is supplied from the first port 18a to the head-side pressure chamber 16a, the first finger 2a retracts and is further separated from the second finger 2b. When compressed air is supplied from the second port 18b to the rod-side pressure chamber 17a, the first finger 2a advances and comes close to the second finger 2b, enabling a workpiece to be grasped between the two fingers 2a and 2b.

Figure 16:
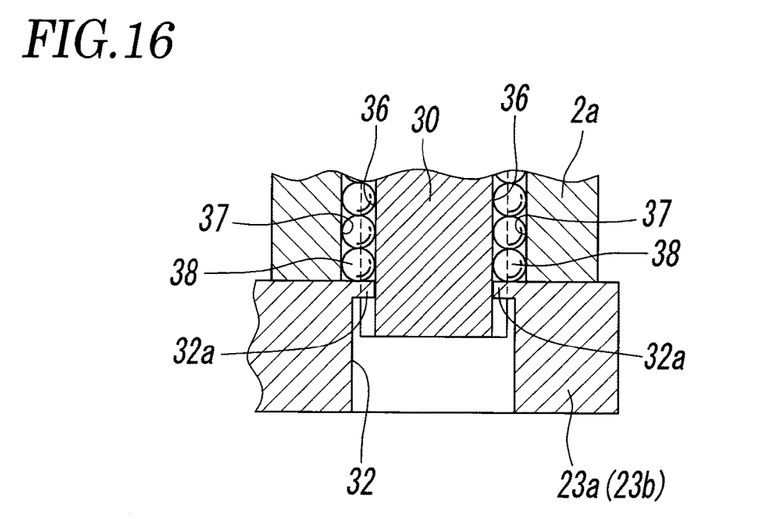
FIG. 16 is a cross-sectional view of major parts of a fifth embodiment of the opening and closing chuck according to the present invention, the cross-sectional view being taken at the same position as in FIG. 7.

In the embodiments described above, as illustrated in FIG. 7, the stoppers 40 are attached to both ends of the movable finger to prevent the rolling elements 38 from coming off from the first concave grooves 36 and second concave grooves 37. However, instead of attaching the stoppers 40 to the end surface fixed to the end block 23a or 23b, the end block 23a or 23b may double as a stopper by directly bringing the end surface of the movable finger into contact with the end block 23a or 23b and fixing the movable finger thereto. In this case, as illustrated in FIG. 16, it is desirable to form a convex part 32a, which is arc-shaped and fits to the first concave groove 36 in the guide rail 30, on the right and left side walls of the clearance hole 32 into which the guide rail 30 fits. The position at which the convex part 32a is formed is preferably the end of the clearance hole 32 on the same side as the movable finger.

The convex part 32a may have a guide function used when the end blocks 23a and 23b advance and retract along the guide rail 30. In this case, the convex part 32a is formed so that it fits to the first concave groove 36 in a sliding state or a state close to it. Even when the stopper 40 is attached to the end of the movable finger as illustrated in FIG. 7, the convex part 32a can be formed on the end blocks 23a and 23b.

The rolling element 38 can also be formed with a roller. In this case, the first concave groove 36 and second concave groove 37 are V-shaped, and the convex part 40b formed on the stopper 40 and the convex part 32a formed in the clearance hole 32 are also V-shaped accordingly.

REFERENCE SIGNS LIST 1A, 1B, 1C, 1D opening and closing chuck
2a, 2b finger
3 chuck body
3a first end
3b second end
4a, 4b cylinder apparatus
6a, 6b cylinder hole
9a, 9b piston
10a, 10b rod
23a, 23b end block
30 guide rail
32 clearance hole
32a convex part
33 rail fitting groove
36 first concave groove
37 second concave groove
38 rolling element
45 stop position adjustment mechanism
46 adjustment bolt
46a top end
51 swinging arm
60 bolt insertion hole
61 fixing bolt
62 screw hole
L, L1, L2 axial line

The invention claimed is:

1. An opening and closing chuck, wherein:
a guide rail, which is linear, is provided on an outer surface of a chuck body, a pair of fingers that grasp a workpiece is provided on the guide rail, and at least one of the pair of fingers is a movable finger that is movable along the guide rail;
the movable finger includes a rail fitting groove into which the guide rail fits, a first concave groove is formed in right and left side surfaces of the guide rail and a second concave groove is formed in inner surfaces of right and left side walls of the rail fitting grooves, the first concave groove on the same side as the guide rail and the second concave groove on the same side as the rail fitting grooves being at positions at which the first concave groove and the second concave groove face each other, a rolling element is provided between the first concave groove and the second concave groove, and the movable finger is movable along the guide rail due to rolling of the rolling element;
as many cylinder apparatuses as there are movable fingers are provided in the chuck body, each cylinder apparatus including a piston and a rod that advance and retract by an action of air pressure in directions of an axial line of a cylinder hole, a top end of the rod extends from an end of the chuck body to an outside, and an end block, which faces the end of the chuck body, is attached to the top end of the rod so as to move toward and away from the end of the chuck body according to forward and backward movements of the rod;
the movable finger is linked to the end block, and opening and closing of the movable finger is driven by the rod through the end block; and
a position at which the rod is linked to the end block is a position near one end side of the end block in a width direction, and a position at which the finger is linked to the end block is a position near the other end side of the end block in the width direction,
wherein the guide rail is formed separately from the chuck body and is fixed to an outer surface of the chuck body, at least one of both ends of the guide rail in the longitudinal direction extends from the chuck body to within a moveable range of the block, and a clearance hole, into which the one end of the guide rail fits, is formed in the end block.

2. The opening and closing chuck according to claim 1, wherein the movable finger is linked to an inner end surface of the end block with a fixing screw.

3. The opening and closing chuck according to claim 1, wherein the both ends of the guide rail extend from the chuck body.

4. The opening and closing chuck according to claim 1, wherein the end of the guide rail remains fitting into the clearance hole regardless of an operation position of the end block.

5. The opening and closing chuck according to claim 1, wherein part of the movable finger extends from the end of the chuck body to the outside along the guide rail when the pair of fingers is opened to a maximum extent.

6. The opening and closing chuck according to claim 1, wherein a convex part, which fits to the first concave groove in the guide rail, is formed on right and left side walls of the clearance hole.

7. The opening and closing chuck according to claim 6, wherein a position at which the convex part is formed is an end of the clearance hole on the same side as the movable finger.

8. The opening and closing chuck according to claim 6, wherein the convex part has a stopper function that prevents the rolling element from coming off the first concave groove and the second concave groove.

9. The opening and closing chuck according to claim 1 wherein:
  two cylinder apparatuses, first cylinder apparatus and second cylinder apparatus, are provided in the chuck body, a first rod linked to a first piston in the first cylinder apparatus extends from a first end in the chuck body to the outside, a second rod linked to a second piston in the second cylinder apparatus extends from a second end, opposite to the first end, in the chuck body to the outside, a first end block is attached to the first rod, and a second end block is attached to the second rod; and
  each of the pair of fingers is a movable finger, the first finger being linked to the first end block, the second finger being linked to the second end block.

10. The opening and closing chuck according to claim 9, wherein the first cylinder apparatus and the second cylinder apparatus operate independently in an asynchronous manner, and the first finger and the second finger also open and close independently in an asynchronous manner.

11. The opening and closing chuck according to claim 9, wherein the second piston has a larger diameter than the first piston, and a stop position adjustment mechanism that adjusts the stop position of the second end block is provided on the second end block attached to the second rod.

12. The opening and closing chuck according to claim 11, wherein the stop position adjustment mechanism includes an adjustment bolt, the adjustment bolt being screwed into a screw hole formed in the second end block so as to make forward and backward movements of the adjustment bolt adjustable in a direction parallel to the axial line, and when the top end of the adjustment bolt abuts an end surface of the chuck body, a stop position of the second end block is determined.

13. The opening and closing chuck according to claim 9, wherein the first finger and the second finger are structured so as to open and close synchronously by being linked to one end and another end of a swinging arm that is swingable with a center of the swinging arm acting as a fulcrum.

14. The opening and closing chuck according to claim 1, wherein:
  one cylinder apparatus is provided in the chuck body and one of the pair of fingers is a movable finger and another one is a fixed finger; and
  the fixed finger is fixed to the guide rail by inserting a fixing bolt into a bolt insertion hole formed in the fixed finger and screwing the fixing bolt into a screw hole formed in the guide rail, the bolt insertion hole being a hole that is long in the longitudinal direction of the guide rail, a fixing position of the fixed finger being adjustable in the longitudinal direction of the guide rail within a length of the bolt insertion hole.

\* \* \* \* \*